United States Patent
Bollini et al.

(10) Patent No.: US 12,059,814 B2
(45) Date of Patent: Aug. 13, 2024

(54) OBJECT-BASED ROBOT CONTROL

(71) Applicant: Boston Dynamics, Inc., Waltham, MA (US)

(72) Inventors: Mario Bollini, Boston, MA (US); Leland Hepler, Boston, MA (US)

(73) Assignee: Boston Dynamics, Inc., Waltham, MA (US)

( * ) Notice: Subject to any disclaimer, the term of this patent is extended or adjusted under 35 U.S.C. 154(b) by 102 days.

(21) Appl. No.: 17/648,869

(22) Filed: Jan. 25, 2022

(65) Prior Publication Data

US 2022/0241980 A1    Aug. 4, 2022

Related U.S. Application Data

(60) Provisional application No. 63/143,053, filed on Jan. 29, 2021.

(51) Int. Cl.
*B25J 9/16*    (2006.01)

(52) U.S. Cl.
CPC ......... *B25J 9/1697* (2013.01); *B25J 9/1664* (2013.01)

(58) Field of Classification Search
None
See application file for complete search history.

(56) References Cited

U.S. PATENT DOCUMENTS

| | | | | |
|---|---|---|---|---|
| 8,781,629 B2 * | 7/2014 | Ota | ........... | B25J 9/1671 |
| | | | | 700/258 |
| 9,770,823 B2 * | 9/2017 | Huang | ........... | B25J 5/005 |
| 10,890,921 B2 † | 1/2021 | Gillett | | |
| 2018/0231981 A1 | 8/2018 | Storfer et al. | | |
| 2021/0132625 A1 † | 5/2021 | Gillett | | |
| 2021/0283783 A1 † | 9/2021 | Gillett | | |

FOREIGN PATENT DOCUMENTS

| | | | |
|---|---|---|---|
| CN | 116802021 | | 9/2023 |
| EP | 4284602 | | 12/2023 |
| JP | 2001062766 A | * | 3/2001 |
| JP | 2001062766 A | | 3/2001 |

(Continued)

OTHER PUBLICATIONS

International Search Report and Written Opinion for International Application No. PCT/US2022/013684 dated May 6, 2022 in 15 pages.

(Continued)

*Primary Examiner* — Khoi H Tran
*Assistant Examiner* — Bryant Tang
(74) *Attorney, Agent, or Firm* — Knobbe, Martens, Olson & Bear, LLP

(57) ABSTRACT

A method includes receiving sensor data for an environment about the robot. The sensor data is captured by one or more sensors of the robot. The method includes detecting one or more objects in the environment using the received sensor data. For each detected object, the method includes authoring an interaction behavior indicating a behavior that the robot is capable of performing with respect to the corresponding detected object. The method also includes augmenting a localization map of the environment to reflect the respective interaction behavior of each detected object.

28 Claims, 13 Drawing Sheets

(56) References Cited

FOREIGN PATENT DOCUMENTS

| | | |
|---|---|---|
| JP | 2007196300 A | 8/2007 |
| KR | 10-2023-0138487 | 10/2023 |
| WO | WO 2022164793 | 4/2022 |

OTHER PUBLICATIONS

Martins et al., "Extending Maps with Semantic and Contextual Object Information for Robot Navigation: a Learning-Based Framework Using Visual and Depth Cues" J Intell Robot Syst 99, 555-569 dated Feb. 29, 2020.
Sidaoui et al., "Human-in-the-loop Augmented Mapping," 2018 IEEE/RSJ International Conference on Intelligent Robots and Systems (IROS), pp. 3190-3195, dated Oct. 1, 2018.

\* cited by examiner
† cited by third party

OBJECT-BASED ROBOT CONTROL

CROSS REFERENCE TO RELATED APPLICATIONS

This application claims priority under 35 U.S.C. § 119(e) to U.S. Provisional Application 63/143,053, filed on Jan. 29, 2021. The disclosure of this prior application is considered part of the disclosure of this application and is hereby incorporated by reference in its entirety.

TECHNICAL FIELD

This disclosure relates to object-based robot control.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., legs, wheels, or traction based mechanisms), or some combination of a manipulator and a mobile robot. Robots are utilized in a variety of industries including, for example, manufacturing, transportation, hazardous environments, exploration, and healthcare. As such, the ability of robots to traverse environments with obstacles using coordinated movements provides additional benefits to such industries.

SUMMARY

An aspect of the present disclosure provides a computer-implemented method that, when executed by data processing hardware of a robot causes the data processing hardware to perform operations. The operations include receiving sensor data for an environment about the robot. The sensor data is captured by one or more sensors of the robot. The operations include detecting one or more objects in the environment using the received sensor data. For each detected object, the operations include authoring an interaction behavior indicating a behavior that the robot is capable of performing with respect to the corresponding detected object. The operations include augmenting a localization map of the environment to reflect the respective interaction behavior of each detected object.

The aspect of the disclosure may include one or more of the following optional features. In some implementations, the operations further include, for each detected object, generating a graphical representation of the interaction behavior that is selectable by an operator of the robot. In those implementations, augmenting the localization map of the environment includes augmenting the localization map of the environment to reflect the graphical representation of the interaction behavior of each detected object. In further implementations, the operations further include, when the robot encounters a respective detected object while navigating the environment, displaying the respective graphical representation associated with the respective detected object in a viewport. In even further implementations, the viewport displays a visual feed from the one or more sensors of the robot. In other even further implementations, the operations further include, when the robot encounters the respective detected object while navigating the environment, receiving an operation input indication indicating selection of a respective interaction behavior associated with the respective detected object and operating the robot to execute the respective interaction behavior. In other further implementations, the graphical representation includes a menu of interaction behaviors associated with the corresponding object that are selectable by the operator of the robot.

In some implementations, the operations further include, when the robot encounters a respective detected object while navigating the environment, receiving a selection of a respective interaction behavior associated with the respective detected object, and operating the robot to execute the respective interaction behavior. In some examples, detecting the one or more objects in the environment using the received sensor data includes identifying the one or more objects using an object detection model configured to recognize objects that the robot is capable of interacting with. In some implementations, the interaction behavior corresponds to a navigational behavior indicating how the robot should navigate in the environment based on the respective object. In further implementations, the navigational behavior defines a respective positioning for the robot in relation to the respective object.

In some implementations, the interaction behavior includes an interaction pose that the robot should assume when interacting with the respective object associated with the interaction behavior. In some examples, authoring the interaction behavior includes receiving a manually-authored behavior for the corresponding detected object from the operator of the robot. In some implementations, authoring the interaction behavior includes matching the corresponding detected object to an object from a list of objects that the robot is capable of interacting with and selecting one or more preconfigured interaction behaviors associated with the object form the list of objects that matches the corresponding detected object. In some implementations, the operations further include generating the localization map using the sensor data for the environment captured by the one or more sensors of the robot. In those implementations, the localization map includes features of the environment as localization reference points to localize the robot within the environment when the robot moves about the environment.

Another aspect of the present disclosure provides a robot. The robot includes a body, a sensor system, data processing hardware in communication with the sensor system, and memory hardware in communication with the data processing hardware. The sensor system is at least partially disposed on the body and includes one or more sensors. The memory hardware stores instructions that, when executed on the data processing hardware, cause the data processing hardware to perform operations. The operations include receiving sensor data for an environment about the robot. The sensor data is captured by the one or more sensors of the robot. The operations include detecting one or more objects in the environment using the received sensor data. For each detected object, the operations include authoring an interaction behavior indicating a behavior that the robot is capable of performing with respect to the corresponding detected object. The operations include augmenting a localization map of the environment to reflect the respective interaction behavior of each detected object.

This aspect of the disclosure may include one or more of the following optional features. In some implementations, the operations further include, for each detected object, generating a graphical representation of the interaction behavior that is selectable by an operator of the robot. In those implementations, augmenting the localization map of the environment includes augmenting the localization map of the environment to reflect the graphical representation of the interaction behavior of each detected object. In further implementations, the operations further include, when the robot encounters a respective detected object while navigating the environment, displaying the respective graphical representation associated with the respective detected object in a viewport. In even further implementations, the viewport displays a visual feed from the one or more sensors of the robot. In other even further implementations, the operations further include, when the robot encounters the respective detected object while navigating the environment, receiving an operator input indication indicating selection of a respective interaction behavior associated with the respective detected object and operating the robot to execute the respective interaction behavior. In other further implementations, the graphical representation includes a menu of interaction behaviors associated with the corresponding object that are selectable by the operator of the robot.

In some examples, the operations further include, when the robot encounters a respective detected object while navigating the environment, receiving a selection of a respective interaction behavior associated with the respective detected object, and operating the robot to execute the respective interaction behavior. In some implementations, detecting the one or more objects in the environment using the received sensor data includes identifying the one or more objects using an object detection model configured to recognize objects that the robot is capable of interacting with. In some implementations, the interaction behavior corresponds to a navigational behavior indicating how the robot should navigate in the environment based on the respective object. In further implementations, the navigational behavior defines a respective positioning for the robot in relation to the respective object.

In some examples, the interaction behavior includes an interaction pose that the robot should assume when interacting with the respective object associated with the interaction behavior. In some implementations, authoring the interaction behavior includes receiving a manually-authored behavior for the corresponding detected object from the operator of the robot. In some implementations, authoring the interaction behavior includes matching the corresponding detected object to an object from a list of objects that the robot is capable of interacting with and selecting one or more preconfigured interaction behaviors associated with the object from the list of objects that matches the corresponding detected object. In some examples, the operations further include generating the localization map using the sensor data for the environment captured by the one or more sensors of the robot. In those examples, the localization map includes features of the environment as localization reference points to localize the robot within the environment when the robot moves about the environment.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
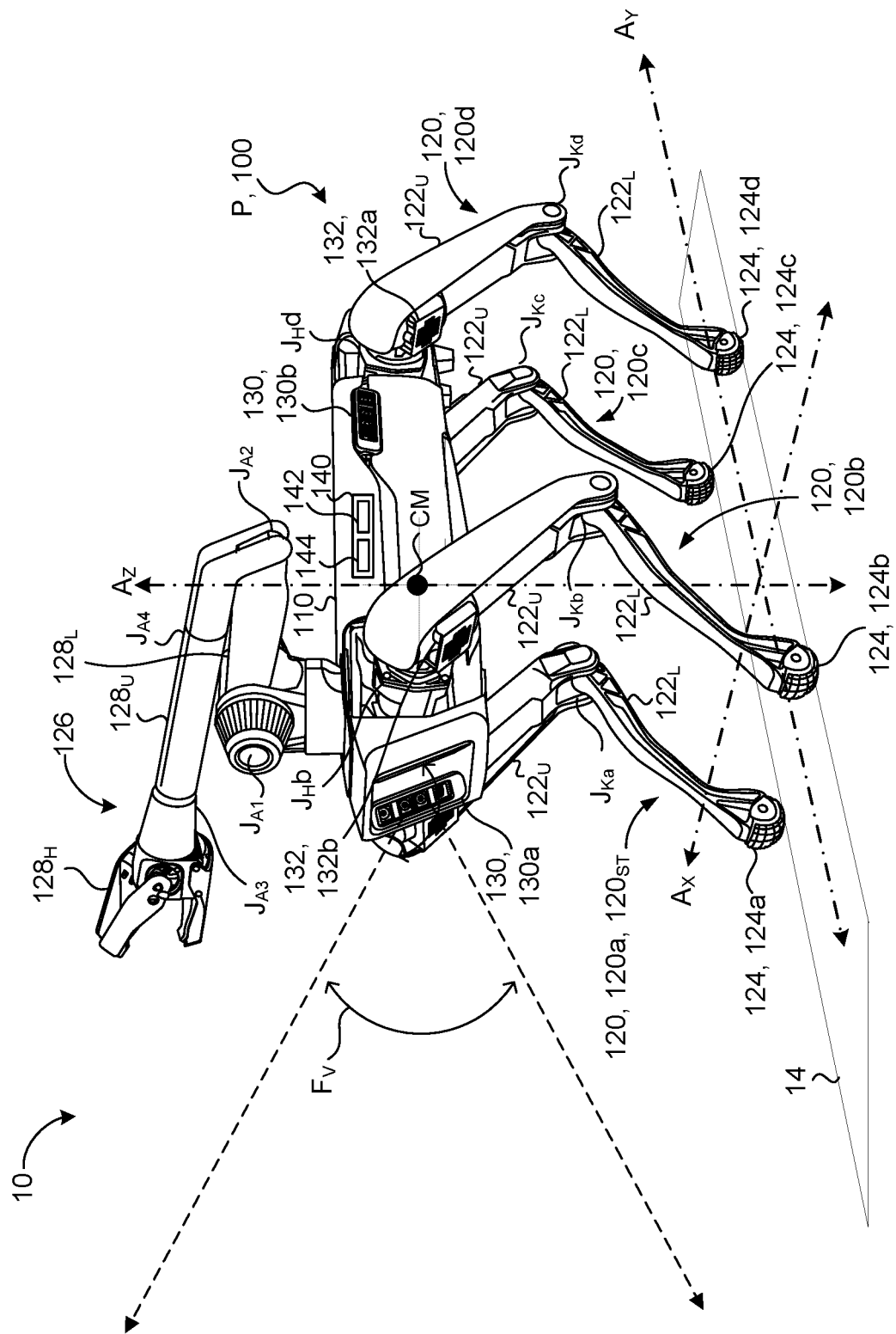
FIG. 1A is a perspective view of an example robot capable of object-based robot control.

As robots progress toward a greater degree of automation, especially with respect to mobility, robot navigation still places some inherent burden on an operator of the robot to configure information regarding the environment where the robot is, or will be, operating. The operator is often responsible for the task of designing how the operator expects the robot to interact with the environment. For example, the operator programs or teaches the robot how to move within the environment and/or how to interact with elements located in the environment. Commonly, this means that the operator has the task of defining an element and authoring or coding maneuvers (i.e., behaviors) for the robot to perform in order to define how the robot may interact with that element.

To illustrate, the operator may intend to use the robot to inspect the mechanics of a building on a routine basis. While inspecting the mechanics, the operator expects the robot to at least inspect a few critical gas meters and to inspect some older sections of pipe for gas leaks. Since the robot is initially unfamiliar with the building and these objects (i.e., the gas meters and sections of pipe), the operator has to teach the robot the information about the building to enable the robot to move to the objects and also how to perform the inspection of these objects. Here, performing an inspection of these objects may include executing a particular posture or pose for the robot such that one or more sensors of the robot will be oriented to visually inspect the gas meters and/or sections of pipe. The operator therefore authors these inspection behaviors by coding the movements that the robot will need to undertake to execute the inspection behaviors. With these steps, the robot gains an intelligence to perform the expected inspection. That is, the operator feeds the robot knowledge using the coded configuration to be able to subsequently perform the inspection routine for the mechanics of the building.

Although the robot will be able to eventually interact with elements according to the authored behaviors, the entire process of configuring the authored behaviors may be rather laborious. Additionally, when the operator intends to use the robot to perform tasks authored as behaviors, the process of configuring these behaviors may delay the deployment of the robot in the environment; thereby preventing the robot from being able to be used "out of the box." Moreover, by requiring some degree of sophistication to program behaviors, the configuration process affects the ease of use of the robot. For example, the process (e.g., a coding process) to establish behaviors may demand an expertise that makes the robot less user-friendly. As such, one may be less willing to use a robot to perform such tasks based on the resources or time that needs to be invested to setup tasks for the robot.

The operator of the robot, however, may prefer to do a minimal amount of work to setup a task for the robot to perform. To minimize the amount of setup, the robot may be programmed to build a site map for the environment where the robot will be operating by populating the site map with objects detected by the robot that the robot may be capable of interacting with. This approach aims to leverage the robot's ability to detect objects using its sensor system while the robot generates a map of the environment (e.g., a site map). Here, for localization and navigation purposes, the robot may initially be taught the environment in a mapping process. For example, during the mapping process, the operator of the robot may initially drive the robot through the environment collecting sensor data. The sensor data (e.g., image data or point cloud data) gathered during this initial mapping process can allow the robot to construct a site map of the environment referred to as a localization map. The robot can generate the localization map by defining features present within the environment using the sensor data. In other words, based on the sensor data, the robot can identify localization features in the environment that the robot may later use as localization reference points to determine where the robot is located within the environment. This type of mapping process enables the robot to subsequently navigate the environment to perform a particular task. For instance, the site may include a structural pillar that the robot uses as a localization feature. Here, when the robot moves through the environment and gathers sensor data that corresponds to the structural pillar, the geometry and orientation of the structural pillar relative to the robot as captured by the sensor data informs the robot that it is at some definitive location in the space. For instance, the sensor data corresponding to the structural pillar informs the robot that it is some distance from a door or other features present on the site.

An object behavior system may use the sensor data gathered while the robot initially moves through the environment (e.g., being driven by the operator) to perform an object detection process in order to identify objects within the environment with which the robot is capable of interacting. This object detection process may occur as the robot is being driven through the environment to form the localization map or may occur as a processing step after initially driving the robot through the environment. The object behavior system can be configured (e.g., trained) to recognize objects generally, or more specifically objects that have been designated as interactable objects. Here, an interactable object refers to an object with which the robot is capable of interacting. Interactable objects may include, without limitation, graspable objects (e.g., graspable by an end-effector of a robotic manipulator of the robot), actuatable objects (e.g., objects that may change a state due to interaction with the robot), movable objects, inspectable objects, etc. Once an interactable object has been detected in the environment based on the sensor data (e.g., during the initial generation of the localization map), one or more behaviors may be associated with the interactable object or authored for the interactable object. As discussed below, the one or more behaviors may be authored and included in the localization map to be subsequently referenced by controllers of the robot. In some examples, the behaviors are presented as a visual graphic for an operator to select when controlling the robot. Here, a behavior is one or more planned movements for the robot or some portion of the robot (e.g., an arm of the robot) to perform relative to the interactable object. By associating behaviors with interactable objects, an operator of the robot may easily configure tasks for the robot to perform in the environment. This may allow the operator to avoid having to understand how to code behaviors for the robot.

Generally speaking, when the robot navigates a site using the localization map, the robot may follow waypoints. A waypoint refers to a representation of what the robot sensed (e.g., according to its sensor system) at a particular place within the environment. The robot may define a waypoint at a particular position in space within the environment when features of the environment serve as reliable features that offer repeatability for the robot to maneuver about the environment. For instance, some more common reliable features are corners of a room or edges of walls. When the robot generates a waypoint, the waypoint may also include information indicating how to position or to move the robot in order to travel to an adjacent waypoint; allowing the robot to establish a reliable path to navigate through the environment. Yet when the localization map also includes, or is modified to include interactable objects, the robot may navigate the environment using the interactable objects instead of, or in conjunction with, waypoints. In such a scenario, a mission for the robot to perform a particular task may be based on interactable objects and/or waypoints. In this context, a mission refers to a routine to perform one or more actions or task(s) in the environment that involves interacting with an interactable object. To illustrate, the inspection routine for the mechanics of the building may be a mission setup by an operator. By basing a mission on one or more interactable objects, the setup of the robot may more closely mirror the task-based operation of the robot, allowing the robot setup to be more intuitive for an operator.

With the modification of a localization map to include interactable objects and their associated behavior(s), the robot may be operated to perform one or more tasks that involve interactable objects and the robot may navigate through the environment to the interactable objects based on the modified localization map. For example, the robot may navigate through the environment and perform the tasks involving the interactable objects autonomously, or the robot may be controlled or semi-autonomously controlled by an operator of the robot. For instance, the localization map may be visually provided to the operator and the operator may control the robot from an interface displaying, e.g., an augmented reality representation.

Robots may be remotely controlled by a remote controller (also referred to as a controller), such as a mobile device, that enables the operator to communicate with the robot over some distance. In such configurations, the operator does not need to be tethered to the robot to provide commands that control the operation of the robot. Often, these remote controllers include a means to provide directional control to the robot (e.g., with a joystick, directional pad, or touchscreen controls) and a display that provides visual feedback to the operator. Here, one or more sensors of a sensor system for the robot may provide the visual feedback. For example, the sensor system provides a camera feed to the operator of what the robot is currently "seeing" or perceiving with its sensor(s). In some examples, the operator may select or toggle through different sensors to change the feed at the display to a sensor of choice for a particular operation. Although the sensor system may perceive the environment in three dimensions (3D) (e.g., using sensors that produce volumetric point clouds), a display viewport of the remote controller may depict a two-dimensional (2D) representation of the environment (or, in suitable cases, a 3D representation). The display viewport may comprise any suitable configuration, such as a display screen at the remote controller, a monitor remote from the remote controller, or a virtual reality headset.

With the addition of interaction points corresponding to interactable objects, the operator can view an augmented reality representation such that the 2D portrayal of the 3D environment about the robot includes annotations that indicate the presence of an interaction point (i.e., interactable object). In such configurations, if the robot turns to orient its sensor(s) to view a ball valve, the ball valve can appear on the screen (or display) of the remote controller (e.g., in the viewport) with annotations or tags to indicate that it is an interactable object. These annotations may be selectable by the operator to allow the operator to set up or author a behavior for the interactable object (e.g., either a prepopulated behavior or custom behavior). Therefore, as interactable objects are built-into or included in a localization map, the controller may serve as an interface to author behaviors, and more broadly, for the operator to configure missions based on behaviors associated with interactable objects.

Figure 1B:
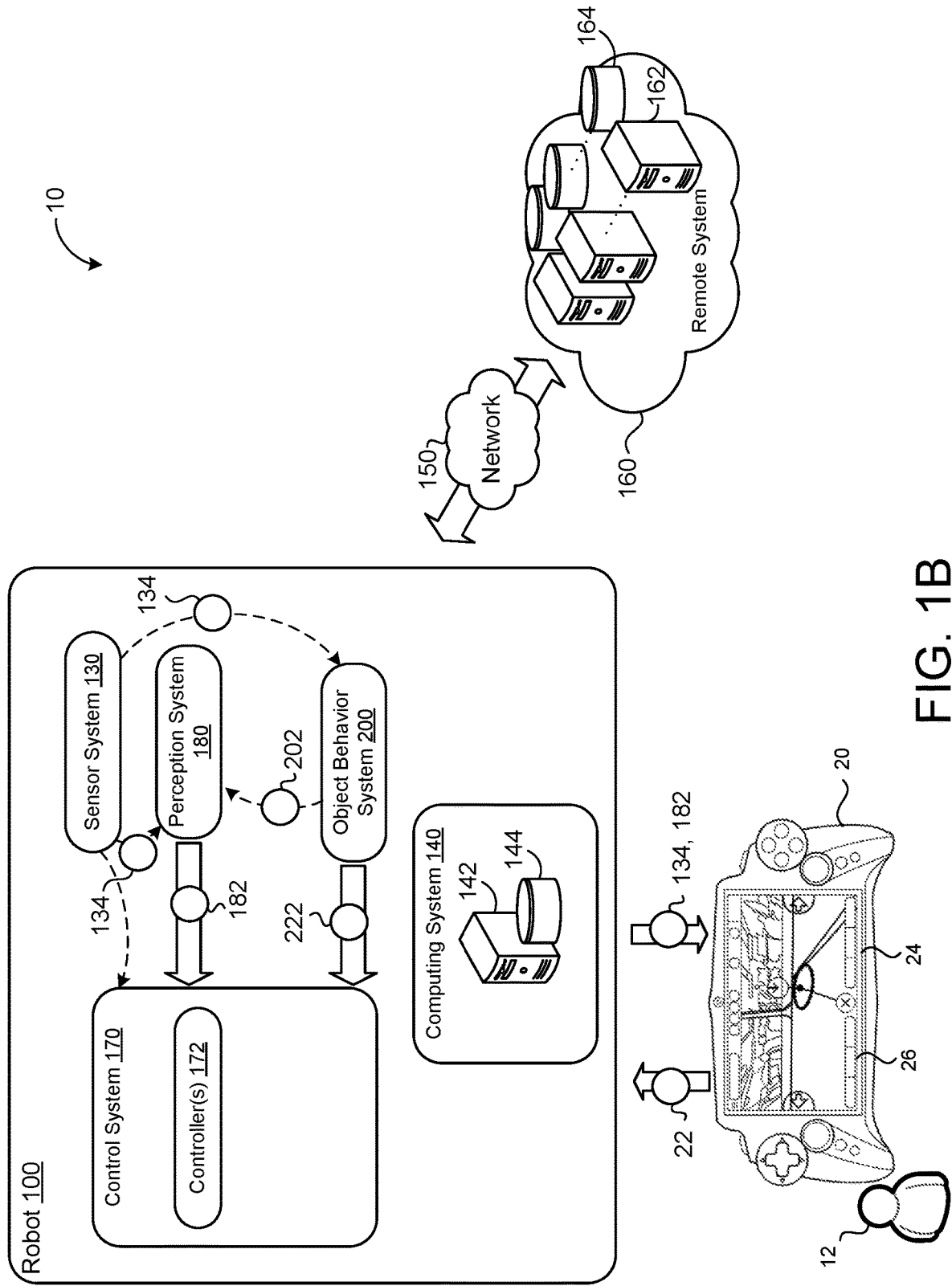
FIG. 1B is a schematic view of example systems of the robot of FIG. 1A.

Referring to FIGS. 1A and 1B, the robot 100 includes a body 110 with locomotion based structures such as legs 120a-d coupled to the body 110 that enable the robot 100 to move about the environment 10. In some examples, each leg 120 is an articulable structure such that one or more joints J permit members 122 of the leg 120 to move. For instance, each leg 120 includes a hip joint $J_H$ coupling an upper member 122, $122_U$ of the leg 120 to the body 110 and a knee joint $J_K$ coupling the upper member $122_U$ of the leg 120 to a lower member $122_L$ of the leg 120. Although FIG. 1A depicts a quadruped robot with four legs 120a-d, the robot 100 may include any number of legs or locomotive based structures (e.g., a biped or humanoid robot with two legs, or other arrangements of one or more legs) that provide a means to traverse the terrain within the environment 10.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint JA such that the distal end 124 is articulable with respect to the lower member $122_L$ of the leg 120.

In the examples shown, the robot 100 includes an arm 126 that functions as a robotic manipulator. The arm 126 may be configured to move about multiple degrees of freedom in order to engage elements of the environment 10 (e.g., interactable objects within the environment 10). In some examples, the arm 126 includes one or more members 128, where the members 128 are coupled by joints J such that the arm 126 may pivot or rotate about the joint(s) J. For instance, with more than one member 128, the arm 126 may be configured to extend or to retract. To illustrate an example, FIG. 1A depicts the arm 126 with three members 128 corresponding to a lower member $128_L$, an upper member $128_U$, and a hand member $128_H$ (e.g., also referred to as an end-effector $128_H$). Here, the lower member $128_L$ may rotate or pivot about a first arm joint $J_{A1}$ located adjacent to the body 110 (e.g., where the arm 126 connects to the body 110 of the robot 100). The lower member $128_L$ is coupled to the upper member $128_U$ at a second arm joint $J_{A2}$ and the upper member $128_U$ is coupled to the hand member $128_H$ at a third arm joint $J_{A3}$. In some examples, such as FIG. 1A, the hand member $128_H$ or end-effector $128_H$ is a mechanical gripper that includes one or more moveable jaws configured to perform different types of grasping of elements within the environment 10. In the example shown, the end-effector $128_H$ includes a fixed first jaw and a moveable second jaw that grasps objects by clamping the object between the jaws. The moveable jaw is configured to move relative to the fixed jaw in order to move between an open position for the gripper and a closed position for the gripper (e.g., closed around an object). In some implementations, the arm 126 additionally includes a fourth joint $J_{A4}$. The fourth joint $J_{A4}$ may be located near the coupling of the lower member $128_L$ to the upper member $128_U$ and function to allow the upper member $128_U$ to twist or rotate relative to the lower member $128_L$. In other words, the fourth joint $J_{A4}$ may function as a twist joint similarly to the third joint $J_{A3}$ or wrist joint of the arm 126 adjacent the hand member $128_H$. For instance, as a twist joint, one member coupled at the joint J may move or rotate relative to another member coupled at the joint J (e.g., a first member coupled at the twist joint is fixed while the second member coupled at the twist joint rotates). In some implementations, the arm 126 connects to the robot 100 at a socket on the body 110 of the robot 100. In some configurations, the socket is configured as a connector such that the arm 126 may attach or detach from the robot 100 depending on whether the arm 126 is needed for operation.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction (e.g., along a z-direction axis $A_Z$). The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 14 where distal ends 124 of the legs 120 of the robot 100 may generate traction to help the robot 100 move about the environment 30. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_Z$.

In order to maneuver about the environment 10 or to perform tasks using the arm 126, the robot 100 includes a sensor system 130 (also referred to as a vision system) with one or more sensors 132, 132a-n. For instance, FIG. 1A illustrates a first sensor 132, 132a mounted at a head of the robot 100 (i.e., near a front portion of the robot 100 adjacent the front legs 120a-b), a second sensor 132, 132b mounted near the hip of the second leg 120b of the robot 100, a third sensor 132, 132c corresponding to one of the sensors 132 mounted on a side of the body 110 of the robot 100, a fourth sensor 132, 132d mounted near the hip of the fourth leg 120d of the robot 100, and a fifth sensor 132, 132e mounted at or near the end-effector $128_H$ of the arm 126 of the robot 100. The sensors 132 may include vision/image sensors, inertial sensors (e.g., an inertial measurement unit (IMU)), force sensors, and/or kinematic sensors. Some examples of sensors 132 include a camera such as a stereo camera, a time-of-flight (TOF) sensor, a scanning light-detection and ranging (LIDAR) sensor, or a scanning laser-detection and ranging (LADAR) sensor. In some examples, the sensor 132 has a corresponding field(s) of view $F_v$ defining a sensing range or region corresponding to the sensor 132. For instance, FIG. 1A depicts a field of a view $F_v$ for the robot 100. Each sensor 132 may be pivotable and/or rotatable such that the sensor 132 may, for example, change the field of view $F_v$ about one or more axis (e.g., an x-axis, a y-axis, or a z-axis in relation to a ground plane). In some examples, multiple sensors 132 may be clustered together (e.g., similar to the first sensor 132a) to stitch a larger field of view $F_v$ than any single sensor 132. With sensors 132 placed about the robot 100, the sensor system 130 may have a 360 degree view or a nearly 360 degree view of the surroundings of the robot 100.

When surveying a field of view $F_v$ with a sensor 132, the sensor system 130 generates sensor data 134 (e.g., image data) corresponding to the field of view $F_v$. The sensor system 130 may generate the field of view $F_v$ with a sensor 132 mounted on or near the body 110 of the robot 100 (e.g., sensor(s) 132a, 132b). The sensor system 130 may additionally and/or alternatively generate the field of view $F_v$ with a sensor 132 mounted at or near the end-effector $128_H$ of the arm 126 (e.g., sensor(s) 132c). The one or more sensors 132 may capture sensor data 134 that defines the three-dimensional point cloud for the area within the environment 10 about the robot 100. In some examples, the sensor data 134 is image data that corresponds to a three-dimensional volumetric point cloud generated by a three-dimensional volumetric image sensor 132. Additionally or alternatively, when the robot 100 is maneuvering about the environment 10, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 30 about the robot 100. In other words, the sensor system 130 may communicate the sensor data 134 from one or more sensors 132 to any other system of the robot 100 in order to assist the functionality of that system.

In some implementations, the sensor system 130 includes sensor(s) 132 coupled to a joint J. Moreover, these sensors 132 may couple to a motor M that operates a joint J of the robot 100 (e.g., sensors 132, 132b-d). Here, these sensors 132 generate joint dynamics in the form of joint-based sensor data 134. Joint dynamics collected as joint-based sensor data 134 may include joint angles (e.g., an upper member $122_U$ relative to a lower member $122_L$ or hand member $126_H$ relative to another member of the arm 126 or robot 100), joint speed (e.g., joint angular velocity or joint angular acceleration), and/or forces experienced at a joint J (also referred to as joint forces). Joint-based sensor data generated by one or more sensors 132 may be raw sensor data, data that is further processed to form different types of joint dynamics, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

As the sensor system 130 gathers sensor data 134, a computing system 140 stores, processes, and/or to communicates the sensor data 134 to various systems of the robot 100 (e.g., the control system 170, object behavior system 200, and/or remote controller 20). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (e.g., in a single location/area on the robot 100, for example, the body 110 of the robot 100), decentralized (e.g., located at various locations about the robot 100), or a hybrid combination of both (e.g., including a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remotely from the robot 100. For instance, the computing system 140 communicates via a network 150 with a remote system 160 (e.g., a remote server or a cloud-based environment). Much like the computing system 140, the remote system 160 includes remote computing resources, such as remote data processing hardware 162 and remote memory hardware 164. Here, sensor data 134 or other processed data (e.g., data processing locally by the computing system 140) may be stored in the remote system 160 and may be accessible to the computing system 140. In additional examples, the computing system 140 is configured to utilize the remote resources 162, 164 as extensions of the computing resources 142, 144 such that resources of the computing system 140 may reside on resources of the remote system 160.

In some implementations, as shown in FIGS. 1A and 1, the robot 100 includes a control system 170 and a perception system 180. The perception system 180 is configured to receive the sensor data 134 from the sensor system 130 and process the sensor data 134 to generate maps 182. With the maps 182 generated by the perception system 180, the perception system 180 may communicate the maps 182 to the control system 170 in order to perform controlled actions for the robot 100, such as moving the robot 100 about the environment 10. In some examples, by having the perception system 180 separate from, yet in communication with the control system 170, processing for the control system 170 focuses on controlling the robot 100 while the processing for the perception system 180 focuses on interpreting the sensor data 134 gathered by the sensor system 130. For instance, these systems 170, 180 execute their processing in parallel to ensure accurate, fluid movement of the robot 100 in an environment 10.

A given controller 172 may control the robot 100 by controlling movement about one or more joints J of the robot 100. In some configurations, the given controller 172 is software with programming logic that controls at least one joint J or a motor M which operates, or is coupled to, a joint J. For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 128 (e.g., actuation of the hand member $128_H$) of the robot 100. By controlling one or more joints J, actuators or motors M, the controller 172 may coordinate movement for all different parts of the robot 100 (e.g., the body 110, one or more legs 120, the arm 126). For example, to perform a behavior with some movements, a controller 172 may be configured to control movement of multiple parts of the robot 100 such as, for example, two legs 120a-b, four legs 120a-d, or two legs 120a-b combined with the arm 126. In some examples, a controller 172 is configured as an object-based controller that is set up to perform a particular behavior or set of behaviors for interacting with an interactable object.

The control system 170 may be configured to communicate with at least one sensor system 130 and/or any other system of the robot 100 (e.g., the perception system 180 and/or the object behavior system 200). The control system 170 performs operations and other functions using hardware 140. The controller 172 is configured to control movement of the robot 100 to traverse the environment 10 based on input and/or feedback from the systems of the robot 100 (e.g., the perception system 180 and/or the object behavior system 200). This may include movement between poses and/or behaviors of the robot 100. For example, the controller 172 controls different footstep patterns, leg patterns, body movement patterns, and/or vision system-sensing patterns.

In some examples, the control system 170 is in communication with a remote controller 20 that an operator 12 of the robot 100 uses to control the robot 100. The remote controller 20 provides a user interface 26 that enables an operator 12 of the robot 100 to issue commands 22 to the robot 100 (e.g., the control system 170 of the robot 100) while being at some distance from the robot 100 (i.e., remote from the robot 100). These commands 22 may be used to operate the robot 100 (e.g., instruct the control system 170 to perform various degrees of control of the robot 100) and/or to request sensor data 134 from the sensor system 130 about the robot 100 (e.g., a current state of the robot 100). To provide the user interface 26, the remote controller 20 may receive various information from systems of the robot 100 (e.g., the sensor system 130, the control system 170, the perception system 180, and/or the object behavior system 200). In some examples, the remote controller 20 includes a means to provide directional control to the robot (e.g., with a joystick, directional pad, or touchscreen controls) and a display 24 that provides visual feedback to the operator 12 at the user interface 26. The display 24 may include a viewport window that depicts the sensor data 134 or some modified form of the sensor data 134 as a visual feed (e.g., a camera feed). In some implementations, the display 24 depicts the one or more maps 182 generated by the perception system 180 such that the operator 12 may understand the environment 10 where the robot 100 is located and allow the operator 12 to provide commands 22 based on information found in the maps 182. The display 24 may also function as a graphical user interface that enables the operator 12 to generate commands 22 for the robot 100. To aid in the generation of such commands 22, the remote controller 20 may include buttons or other touch functionality to receive selection inputs or other forms of input or feedback from the operator 12.

The perception system 180 is a system of the robot 100 that helps the robot 100 to move more precisely in a terrain with various obstacles. As the sensors 132 collect sensor data 134 for the space about the robot 100 (i.e., the robot's environment 10), the perception system 180 uses the sensor data 134 to form one or more maps 182 for the environment 10. Once the perception system 180 generates a map 182, the perception system 180 is also configured to add information to the map 182 (e.g., by projecting sensor data 134 on a preexisting map) and/or to remove information from the map 182.

In some examples, the perception system 180 generates a localization map 182 and/or derivatives thereof as the one or more maps 182. As stated previously, the localization map 182 refers to a map 182 that enables the robot 100 to determine its location in the environment 10 based on features of the environment 10. The localization map 182 may be initially constructed by driving or moving the robot 100 through the environment 10 where the robot 100 will be operating and gathering sensor data 134 while the robot 100 is being driven through the environment 10. That is, an operator 12 of the robot 100 may teach the robot 100 the parameters of the environment 10 and how to navigate the environment 10 (e.g., autonomously or semi-autonomously) by initially driving the robot 100 through the environment 10. During this mapping process, the perception system 180 determines features (e.g., geometric shapes) of the environment 10 from the gathered sensor data 134 to use as localization reference points. With the localization reference points, the perception system 180 generates the localization map 182 to provide the robot 100 with the means to determine its relative location in the environment 10 during subsequent activity in the environment 10. Stated differently, the localization map 182 functions as a map for a particular environment site (e.g., a site map) constructed from sensor data 134 with prioritized features that enable the robot 100 to understand spatially where it is on the site. Therefore, when the robot 100 is subsequently moving about in the environment 10, the localization map 182 allows the robot 100 to recognize one or more features in order to contextualize its position (e.g., relative to other features in the environment 10).

The object behavior system 200 is a system of the robot 100 that is configured to recognize objects within a given environment 10 that the robot 100 may interact with (i.e., interactable objects 212). By performing this recognition, interaction points 202 representing interactable objects 212 may be included in the map(s) 182 that the robot 100 uses to navigate the environment 10. Thus, the robot 100 may navigate the environment 10 based on locations of respective interaction points 202 representing interactable objects 212, such as to complete a task that requires the robot 100 to navigate to one or more interactable objects 212. The robot 100 may navigate through the environment 10 autonomously, or the robot may be controlled or semi-autonomously controlled by an operator 12 of the robot 100. For example, the operator 12 operates a remote controller 20 and is presented with a visual representation of the localization map 182 and/or interactable objects 212 on the display of the controller 20 for controlling the robot 100 and/or authoring a series of commands for the robot 100.

Therefore, when the robot 100 moves about in the environment 10, the operator 12 of the robot 100 may view real-world objects (e.g., on the display of the remote controller 20) as selectable options that the operator 12 may set up with particular behaviors 222 for the robot 100. In this respect, the object behavior system 200 offers an intuitive approach to authoring robot behaviors 222 with respect to objects in the environment 10 by informing an operator 12 which objects are present in the environment 10 that the object behavior system 200 knows are interactable. Moreover, since the object behavior system 200 may associate one or more preconfigured behaviors 222 with a particular interactable object 212, the operator 12 is able to select a preconfigured behavior 222 in order to author the robot 100 to perform such behavior 222 when an interactable object 212 is presented to the operator 12 (e.g., when the robot 100 is near an interactable object 212). Additionally or alternatively, because a map 182 (e.g., the localization map 182) is populated with interaction points 202, the operator 12 does not necessarily have to drive the robot 100 to a desired interaction point 202 in order for the display 24 of the remote controller 20 to depict the selectable behavior 222 for the interactable object 212 corresponding to the interaction point 202. Rather, the operator 12 may view the map 182 (or some portion thereof) populated with interaction points 202, select an interaction point 202 of interest, and author a behavior 222 with respect to that interaction point 202 without driving the robot 100 anywhere. Additionally, the operator 12 may not be required to actively monitor the robot 100 as it navigates the environment 10 to select a behavior 222 at each interaction point 202, but rather the operator 12 may generate a mission for the robot 100 that includes operating the robot 100 to perform one or more behaviors 222 and the robot 100 may operate autonomously or semi-autonomously as it fulfills the mission. In other words, this allows an operator 12 to generate a mission for the robot 100 that includes one or more behaviors 222 from a general map view rather than requiring active oversight of sensor data 134 captured by the robot 100 and selection of behaviors 222 at the interaction points 202 encountered by the robot 100 over the course of the mission. For example, the operator 12 may be a plant manager that operates a fleet of robots 100 where each robot 100 is configured from the map 182 with interaction points 202 to execute a particular mission in the plant environment 10. With this approach, missions for the robot 100 may be more seamlessly planned without requiring complex robot behavior coding expertise.

Figure 2A:
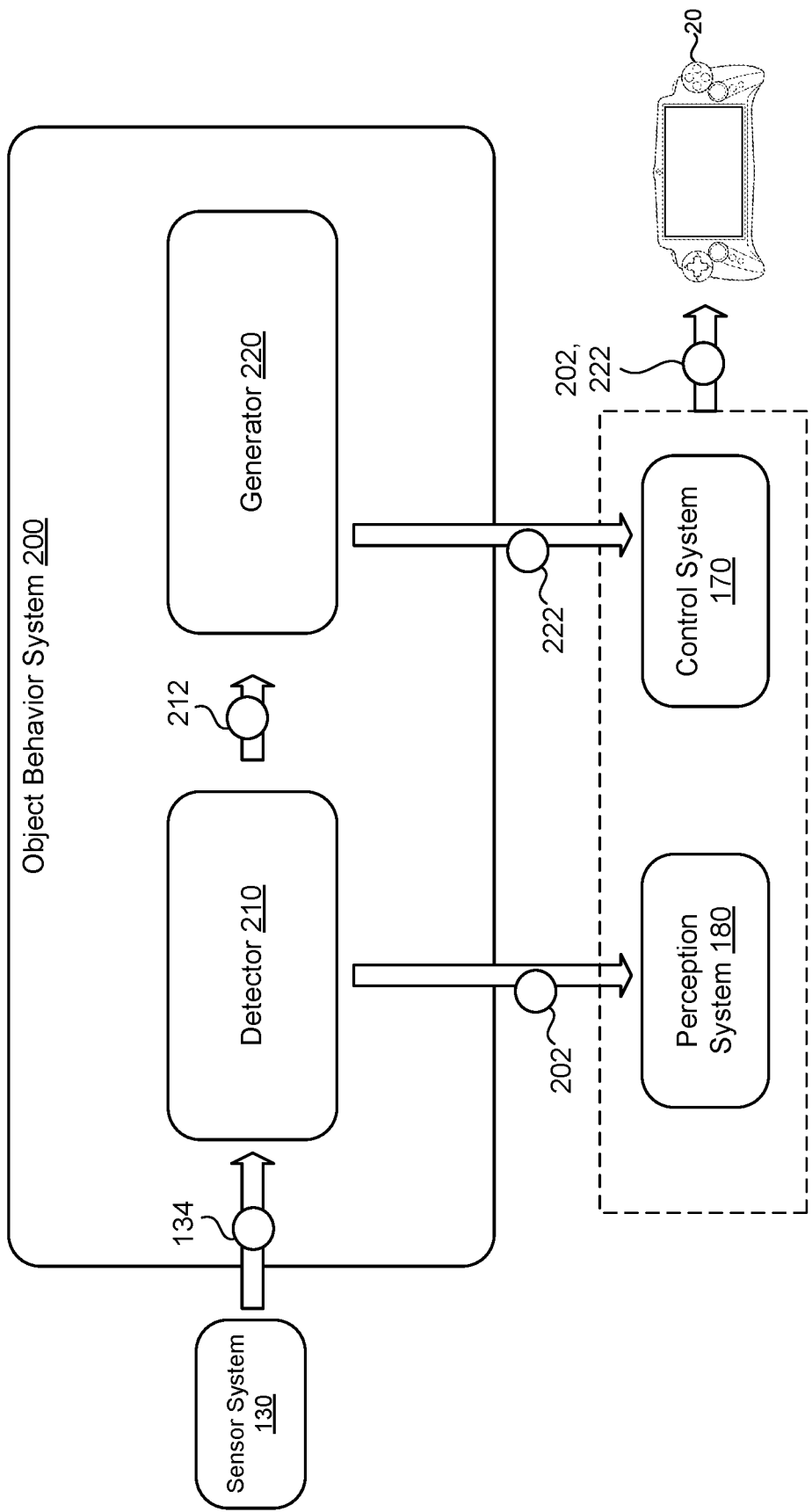
FIGS. 2A-2C are schematic views of example object behavior systems of FIG. 1B.
Figure 2B:
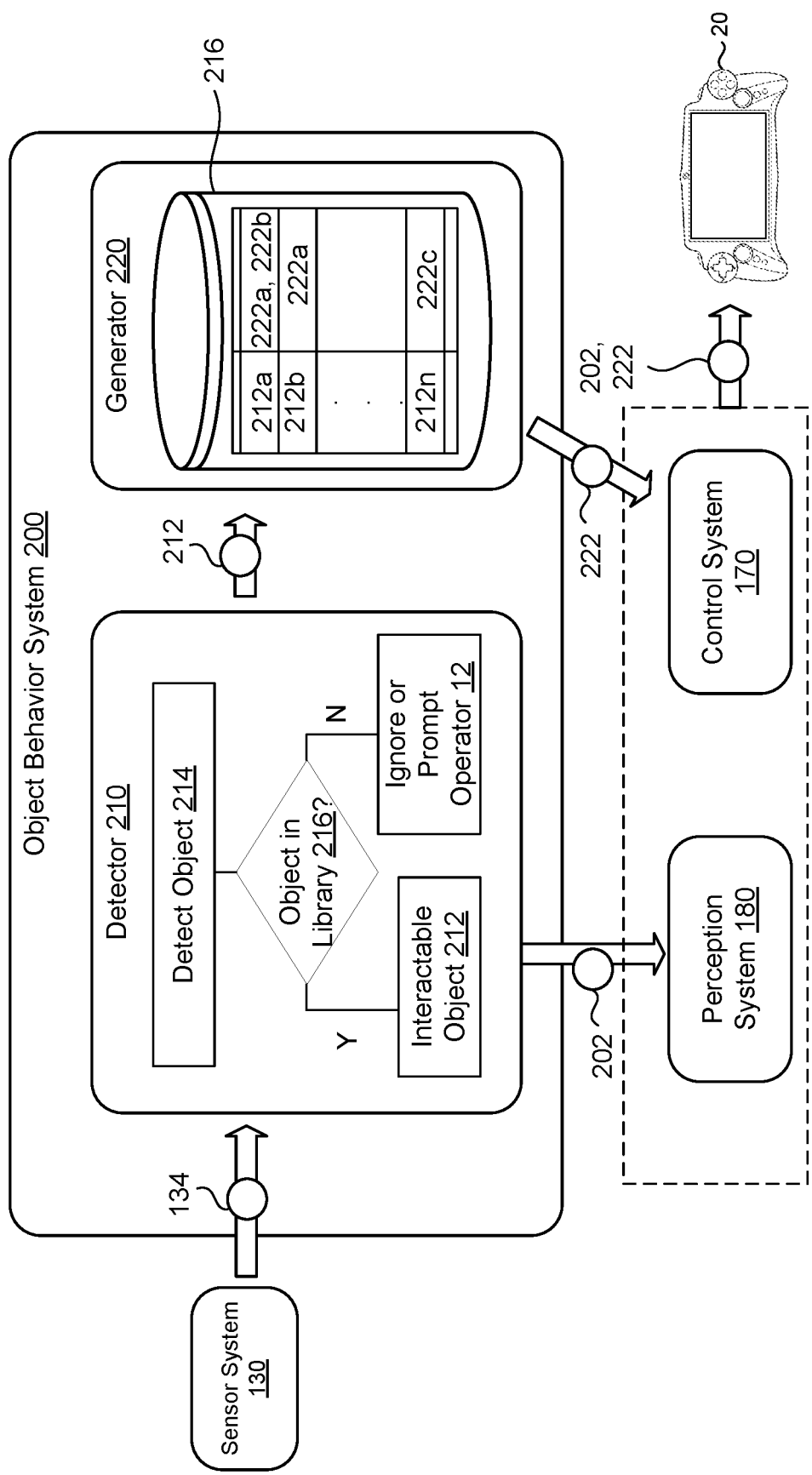
Figure 2C:
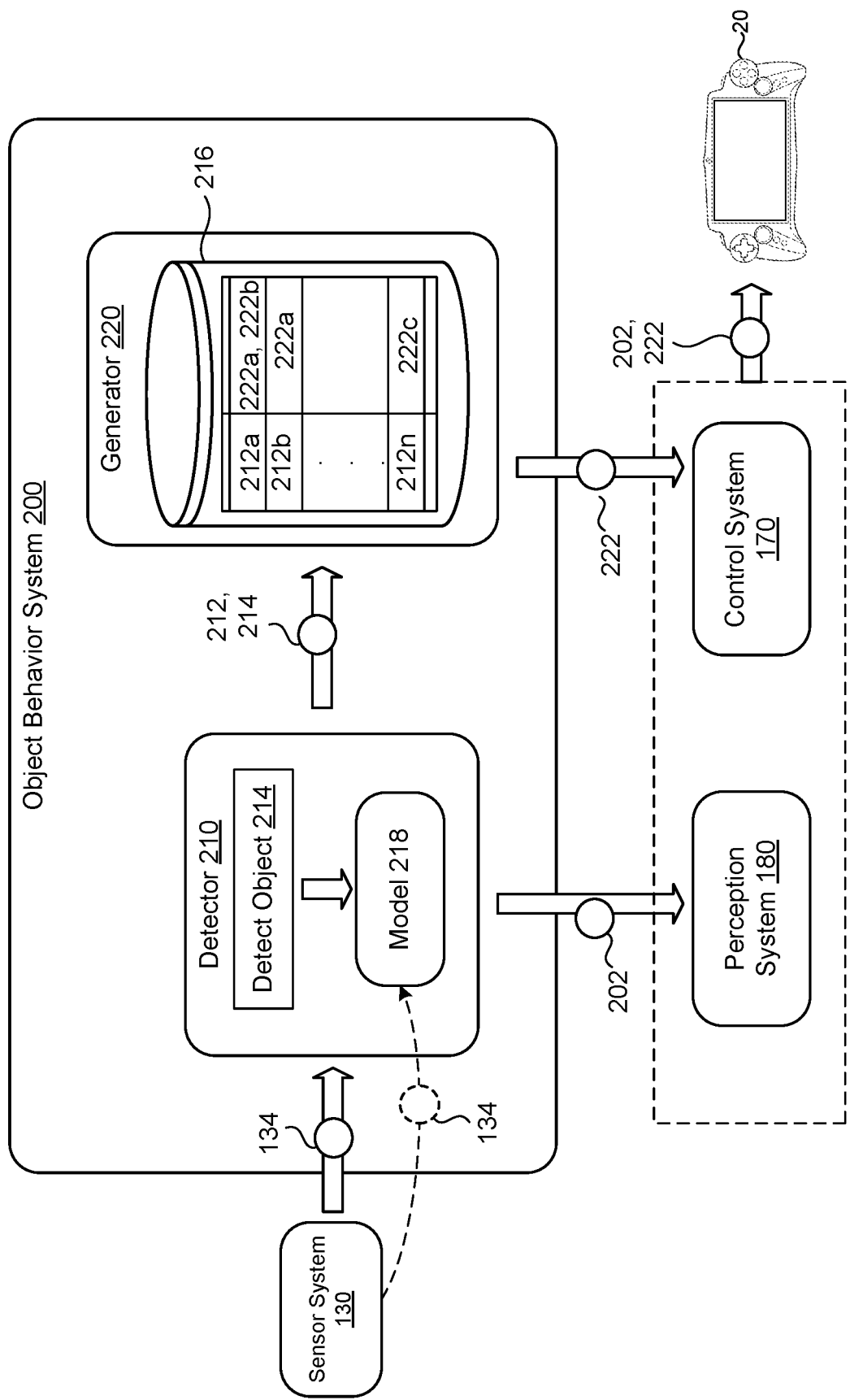

Referring to FIGS. 2A-2C, the object behavior system 200 includes a detector 210 and a generator 220. The detector 210 is configured to receive sensor data 134 for the environment 10 that has been captured by one or more sensors 132 of the sensor system 130. Here, the robot 100 may gather the sensor data 134 provided to the object behavior system 200 while (or after) the robot 100 initially maps the environment 10 for the first time (i.e., builds an initial site map 182). Upon receipt of the sensor data 134 (e.g., image data), the detector 210 detects one or more objects 214 in the environment 10 based on the sensor data 134. In other words, the detector 210 analyzes the sensor data 134 to determine when the sensor data 134 depicts an object 214 is present in the environment 10.

In some implementations, such as FIG. 2B, when the detector 210 recognizes an object 214 from the sensor data 134 (e.g., image data), the detector 210 may query a library 216 or some form of a database that includes a prepopulated list of interactable objects 212 for the robot 100. In other words, a manufacturer of the robot 100, provider of the robot 100, or some other entity, may prepopulate a library 216 of objects (i.e., interactable objects 212) that the robot 100 knows how to interact with or is capable of interacting with. Additionally or alternatively, the robot 100 over time may also contribute to the library 216 based on what the robot 100 has learned or the operator 12 has authored. The detector 210 may use a few techniques to determine whether an object 214 in the library 216 matches an interactable object 212. In one approach, the detector 210 may classify the object 214 into a type or class of object and determine whether the class of object is one that the library 216 confirms is already supported for robot behaviors 222. In another approach, the detector 210 may use the sensor data 134 (or image data 134) to match image data stored in the library 216 for interactable objects 212. That is, the detector 210 looks for object similarity on an image basis to determine whether the object 214 is an interactable object 212. When the recognized object 214 is present in the library 216 (i.e., the query confirms that the object is interactable for the robot), the location of the object 214 may be communicated to the perception system 180 of the robot 100. With the confirmation that the recognized object 214 is an interactable object 212, the perception system 180 may populate an interaction point 202 for the object 214 within one or more of its maps 182 at a location where the object 214 was sensed by the sensor system 130 of the robot 100. For instance, the localization map 182 or some derivative thereof is modified to include the interaction point 202 for the object 214. When the recognized object 214 is not found in the library 216, the object behavior system 200 may ignore the detected object 214 (i.e., assume it is not an interactable object 212) or may be configured to generate a prompt that asks the operator 12 whether the operator 12 wants to designate the detected object 214 as an interactable object 212.

In other examples, such as FIG. 2C, rather than checking a library 216 to determine whether a recognized object 214 is an interactable object 212, the detector 210 includes a model 218 (e.g., an object detection model) that is trained to recognize interactable objects 212. Here, the model 218 may be some form of a machine learning model that learns to classify an object 214 as interactable based on training examples that designate whether an object 214 is interactable. The training examples may be examples of interactable objects 212 (i.e., positive training examples) or non-interactable objects (i.e., negative training examples). The model 218 is initially trained with the training examples until the model 218 reaches some threshold probability that the model 218 can successfully predict whether a detected object 214 is an interactable object 212 and/or what interactable object 212 it is. In some configurations, the model 218 receives, as input, a detected object 214, and generates, as output, a prediction of whether the detected object 214 is an interactable object 212. In some implementations, the model 218 may instead be trained with sensor data 134 to predict whether an interactable object 212 is present at the location corresponding to the sensor data 134.

Once an interactable object 212 has been detected in the environment 10 based on the sensor data 134 (e.g., during the initial generation of the localization map 182), the detector 210 may pass the interactable object 212 to the generator 220 to enable the generator 220 to generate one or more interaction behaviors 222 for the interactable object 212. An interaction behavior 222 (also referred to as a behavior) refers to a one or more planned movements (also referred to as maneuvers) or actions for the robot 100 to perform relative to the interactable object 212. Some examples of interaction behaviors 222 include instructing the robot 100 to strike some pose or posture relative to the interactable object 212, moving one or more joints J, appendages (e.g., legs 120 or arm(s) 126), or actuators of the robot 100 in a particular way, using a particular sensor 132 or peripheral of the robot 100 (e.g., use a gas leak sensor or a thermal imaging sensor), contacting the object 212 in a particular manner (e.g., actuate a portion of the object or grasp the object with a gripper), or any combination thereof. Each behavior 222 may specify anywhere from a single movement or pose of the robot 100 to a sequence of movements or poses to interact with the corresponding object 212.

The interaction behavior 222 may be from a pre-programmed list of authored or partially authored behaviors associated with an interactable object 212 or an interaction behavior 222 authored (e.g., customized) by an operator 12 of the robot 100. For instance, the library 216 of interactable objects 212 may include one or more preconfigured behaviors 222 for each interactable object 212 in the library 216. In other words, referring to FIGS. 2B and 2C, the generator 220 depicts interactable objects 212a-n associated with particular behaviors 222a-c. In these examples, a first interactable object 212a may have two preconfigured behaviors 222a, 222b. A second interactable object 212b may have a single preconfigured behavior 222a, but the same behavior 222 as the first interactable object 212a. An nth interactable object 212n may have a third behavior 222c. A preconfigured behavior 222 is a behavior that has been at least partially authored. For instance, the generator 220 associates the behavior 222 with the interactable object 212 in the environment 10 such that little to no further coding is necessary to perform the behavior 222 on the interactable object 212. Rather, the operator 12 can simply select whether it wants the robot 100 to perform the already authored behavior 222 with respect to the interactable object 212. For instance, if the first interactable object 212a refers to a ball valve, the ball valve may be programmed with an "open" ball valve behavior 222a and a "close" ball valve behavior 222b. Therefore, when a detected object 214 is an interactable object 212 such as a ball valve, the generator 220 may associate either one or both of the "open" ball valve behavior 222a or the "close" ball valve behavior 222b with the ball valve.

Behaviors 222 may range from simple behaviors 222 to complex behaviors 222. For instance, a simple behavior 222 may be as simple as instructing the robot 100 to take a picture of the object (e.g., take a picture of a gauge) while a more complex behavior 222 may be to check a gauge to ensure that the operating pressure for the gauge is within a given tolerance. In the later, a behavior 222 may be partially authored, but receive additional operator 12 inputs to complete the setup of the behavior 222. For instance, the behavior 222 for a gauge may be to "check pressure" and the interface (e.g., the user interface of the remote controller 20) where the operator 12 finalizes the behavior 222 may have fields to enter a desired operating range that the robot 100 will be confirming as it checks the pressure. In this sense, the behaviors 222 may be customizable to perform diagnostics to fit the needs of the operator 12 while still not requiring the operator 12 to author the customizable behavior 222 from scratch.

In some configurations, a behavior 222 may be a navigational behavior 222 that defines a respective positioning for the robot 100 in relation to the interactable object 212. For instance, a behavior 222 that instructs the robot 100 to take a picture of the object 212 may inform the robot 100 what pose or posture the robot 100 should assume in relation to the object 212 to generate sensor data 134 resulting in the picture of the object 212. To illustrate, in order to capture a picture of a pressure gauge near a ground surface for the robot 100, the behavior 222 informs the robot 100 to pitch the front end of the body 110 of the robot 100 towards the floor to capture the picture of a pressure gauge near the floor. In another example, the behavior 222 may include multiple movements or maneuvers to generate the behavior 222. For instance, when the behavior 222 is to open a door in the environment 10, the behavior 222 may perform some or all of the following maneuvers: first position the robot 100 in a particular pose with respect to the door; move the arm 126 of the robot 100 to a handle of the door; grasp the handle of the door with the hand $128_H$ of the arm 126; push or pull the door open; and move through the open door.

In some examples, the generator 220 is configured to associate or author each potential behavior 222 with the interactable object 212. In this regard, the generator 220 may associate all possible behaviors 222 with the interactable object 212 at an interaction point 202 on the map 182. This affords the operator 12 with the opportunity to select any available interaction behavior 222 for a particular interaction point 202 or a particular interactable object 212 present in the environment 10 in order to run that particular behavior 222 already authored by the generator 220.

When the generator 220 associates a behavior 222 with an interactable object 212, the generator 220 and/or the user interface 26 for the operator 12 generates a graphical representation for each behavior 222 that is associated with an interactable object 212. That is, for example, when the interactable object 212 is shown on the display 24 of the remote controller 20 for the robot 100, the interactable object 212 is annotated to depict one or more graphical representations of the behaviors 222 that are possible for that interactable object 212. The operator 12 may then select a behavior 222 for the robot 100 to perform for that interactable object 212 by selecting the displayed graphical representation of the behavior 222. In some examples, the graphical representation of the behavior 222 may be as simple as a text box summarizing the behavior 222 (e.g., "open ball valve") or something more complex like a pictorial representation of the behavior 222 or a preview of the behavior 222. When an interactable object 212 includes more than one behavior 222, the graphical representation of the behaviors 222 may be displayed as one or more selectable menus for the operator 12.

In some implementations, the processes of object detection (e.g., by the detector 210) and behavior association (e.g., by the generator 220) of the object behavior system 200 occur automatically. As an example, these automated processes may occur when the operator 12 instructs or commands the robot 100 to run a routine that drives the robot 100 about the environment 10 using the localization map 182. In another example, these processes occur automatically when the robot 100 is initially generating the localization map 182. That is, as the robot 100 performs the mapping process for the environment 10 (i.e., to build a site map 182), the object behavior system 200 is automatically generating interaction points 202 for the environment 10 where the interaction points 202 correspond to interactable objects 212 loaded (i.e., authored) with interaction behaviors 222. In this respect, the parallel operation of the mapping process and the processes of the object behavior system 200 minimize the need for the operator 12 to setup all of the potential behaviors 222 in the environment 10 in a subsequent step to the mapping process. Moreover, when these processes of the object behavior system 200 occur automatically, the operator 12 may not need to perform any additional input to prompt object detection or behavior association. In other words, the object behavior system 200 is configured such that interactable objects 212 may add themselves to a map 182 (e.g., the localization map 182) as the robot 100 perceives the interactable objects 212 in the sensor data 134. Although the operator 12 may manually interject in these processes, this automation simplifies establishing interactable objects 212 and their respective behaviors 222, allowing the operator 12 to focus on generating missions or tasks for the robot 100 involving the interactable objects 212.

In addition to the operator 12 being able to select from any of the preconfigured behaviors 222 that the generator 220 associates with interactable objects 212, the operator 12 may also have the capability to author his or her own behavior(s) 222 with respect to the interactable object 212. The user interface 26 may also allow the operator 12 to manually author behaviors 222 for objects that the object behavior system 200 did not identify as interactable objects 212. In this sense, the object behavior system 200 in conjunction with the user interface 26 can be flexible to the needs of the operator 12. When the operator 12 authors his or her own behaviors 222, the object behavior system 200 may learn or store these behaviors 222 for future use or to subsequently offer as available behaviors 222 for an interactable object 212. In that same respect, the object behavior system 200 may also learn new interactable objects 212 from objects that the object behavior system 200 did not originally identified as interactable objects 212, but for which the operator 12 manually authored a behavior 222.

Figure 3A:
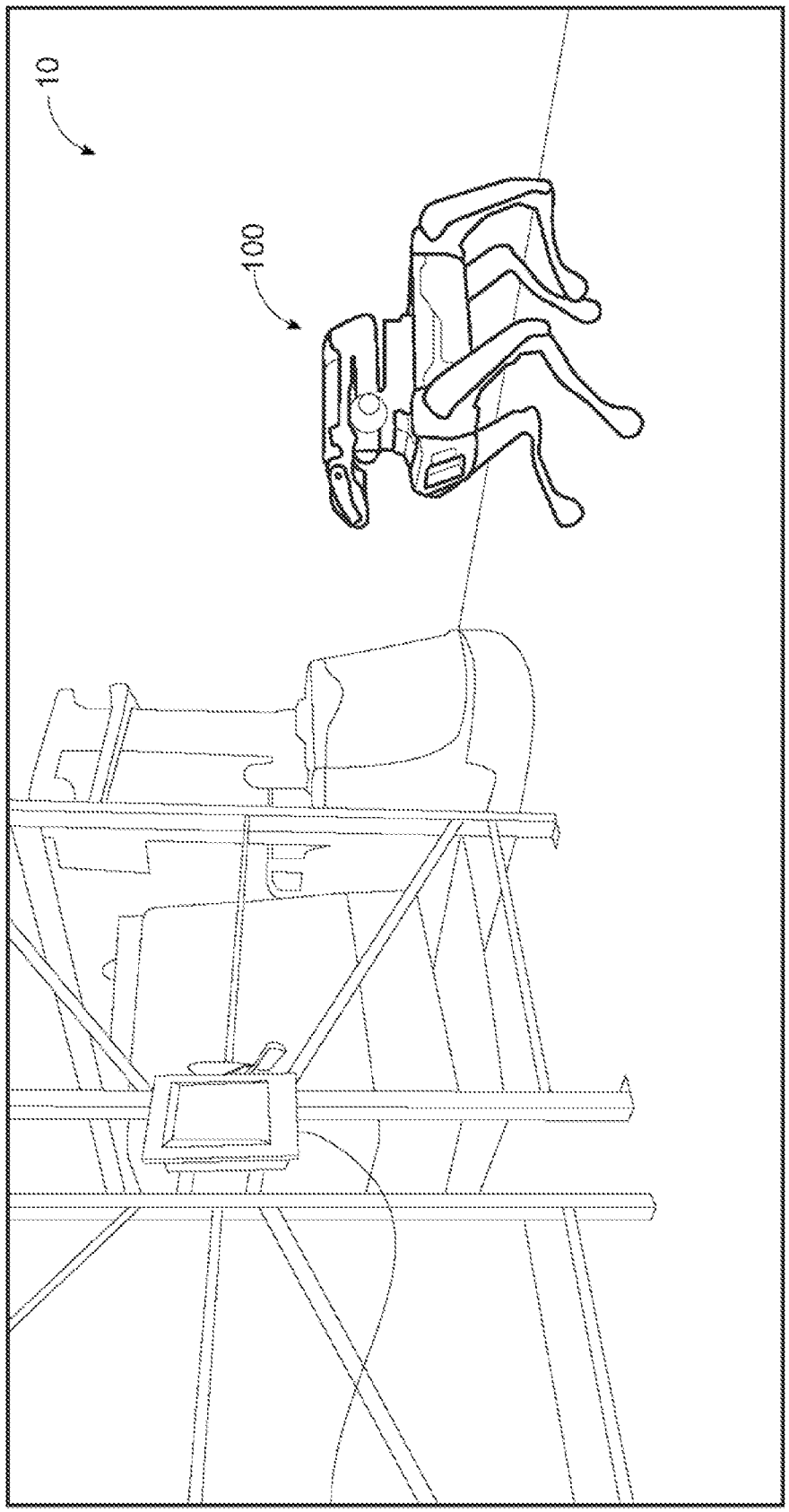
FIGS. 3A-3E are perspective views of an example sequence by the robot of FIG. 1A using an object behavior system.
Figure 3B:
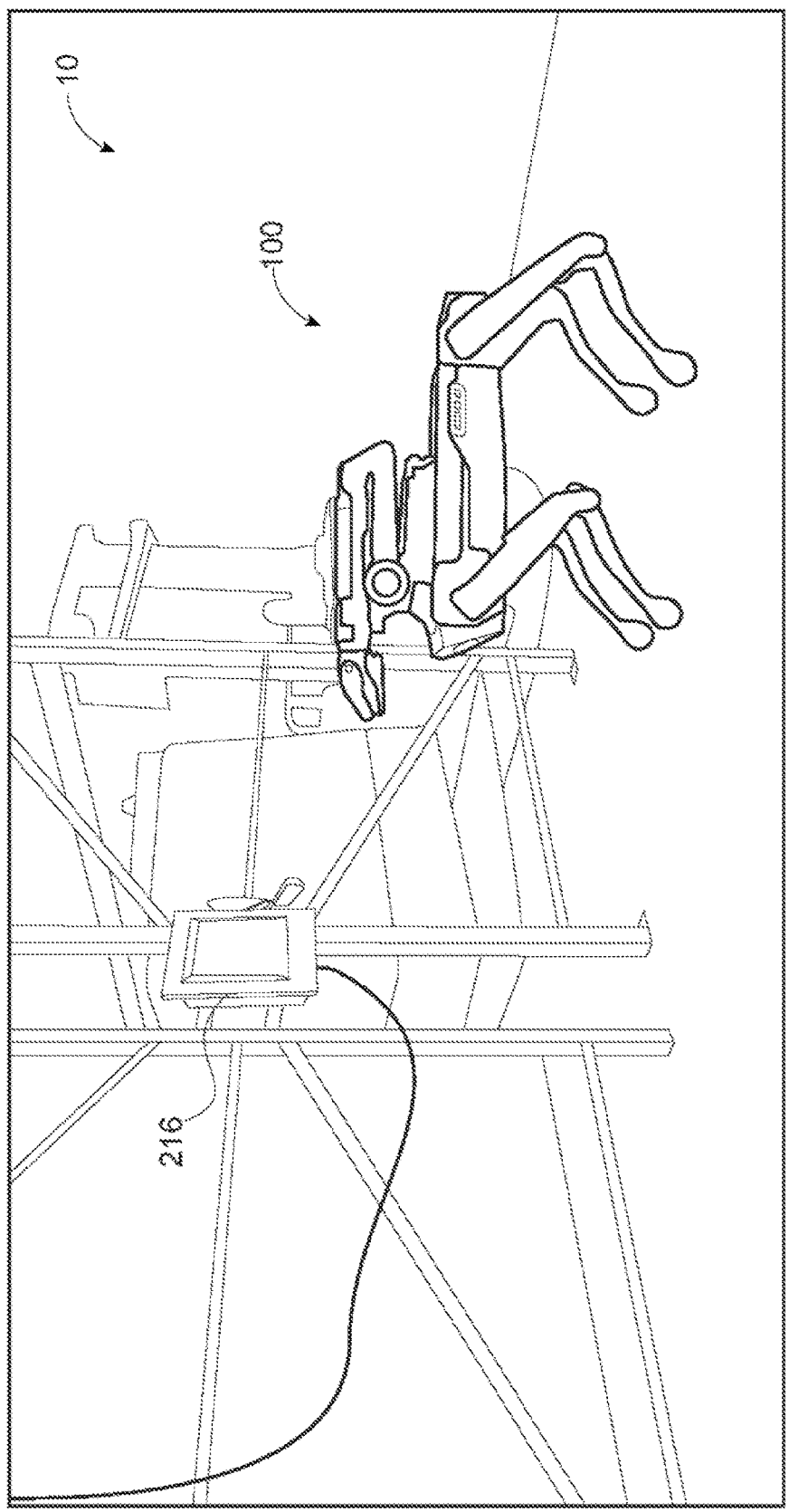
Figure 3C:
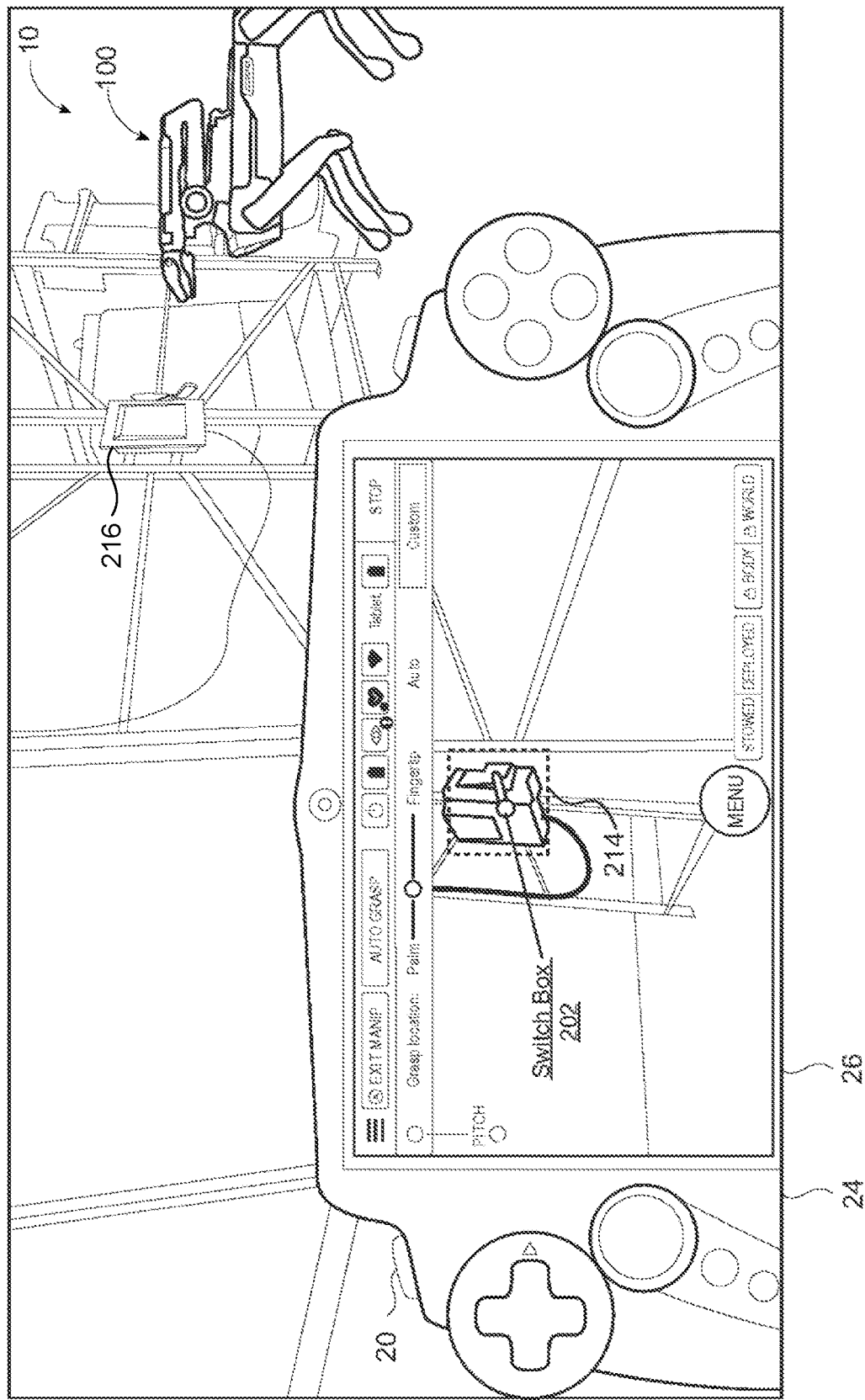

FIGS. 3A-3E illustrate an exemplary sequence of actions for the robot 100 using the object behavior system 200 while the robot 100 is moving through an environment 10 of a warehouse space adjacent to storage racks. In FIG. 3A, a switch box that controls the lights for this particular section of the warehouse is mounted on the storage racks. As the robot 100 is moving along the storage rack in this environment 10, the robot 100 is gathering sensor data 134 for the area around the robot 100 such that the sensor data 134 corresponds to image data of the switch box. In FIG. 3B, the object behavior system 200 identifies the switch box as a detected object 214 from the sensor data 134 gathered by the robot 100. FIG. 3C is a panned out view of FIG. 3B depicting the remote controller 20 displaying the user interface 26 that shows the operator 12 a visual feed from one or more sensors 132 of the robot 100 peering at the switch box 214. Here, the user interface 26 generates an augmented reality representation of the actual sensor data 134 because the user interface 26 depicts graphical representations as annotations that indicate that the switch box 214 is an interaction point 202 corresponding to an interactable object 212. That is, the object behavior system 200 has determined that the switch box 214 is an interactable object 212 and has generated a bounding box around the switch box 214 with a label to convey this to the operator 12 at the user interface 26 of the remote controller 20.

Figure 3D:
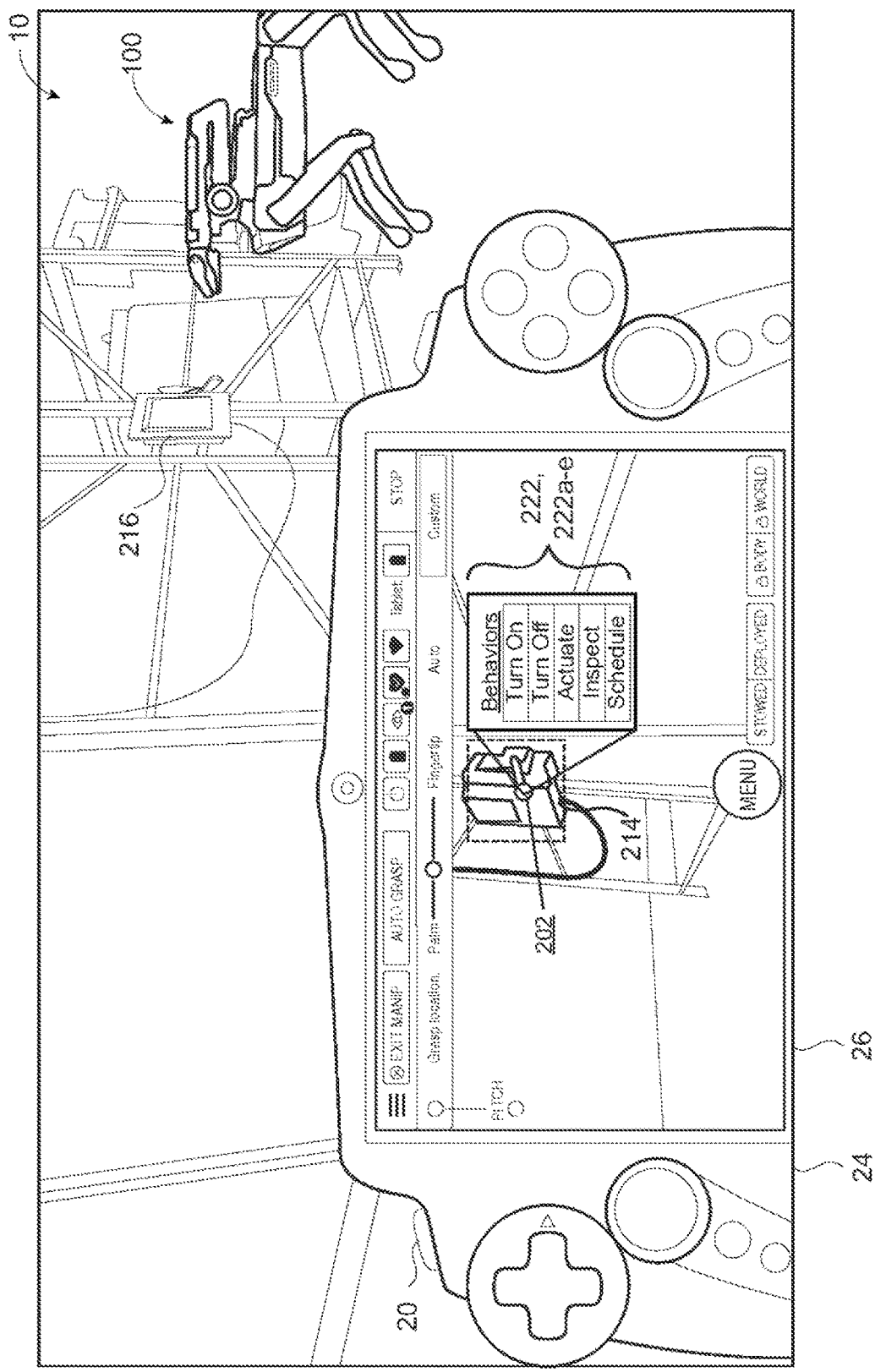
Figure 3E:
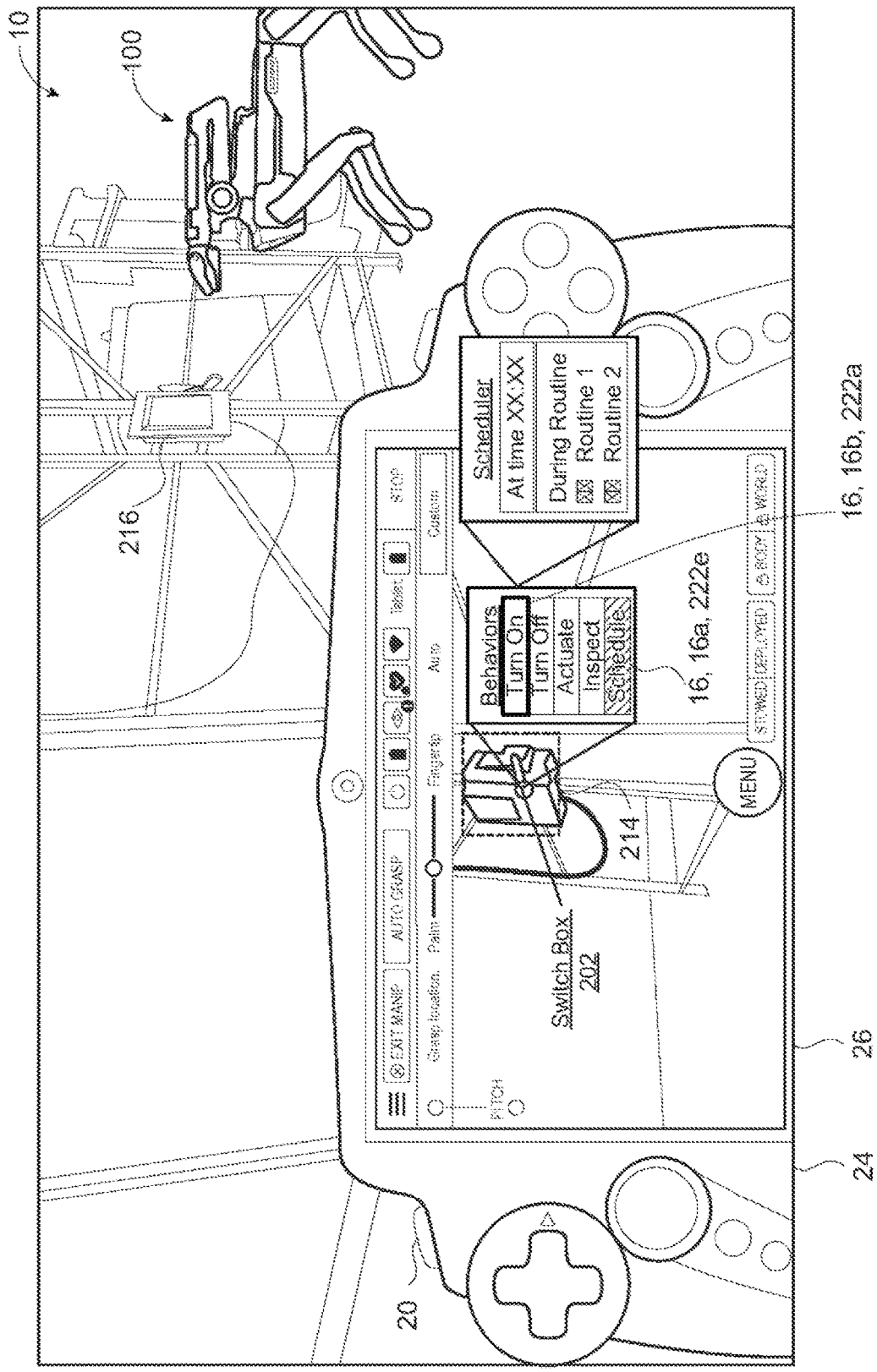

When the operator 12 selects the switch box 214 in the user interface 26, FIG. 3D shows the user interface 26 displaying a menu of behaviors 222, 222a-e as graphical representations for preconfigured behaviors 222 associated with the switch box. These behaviors 222 may include a first behavior 222a to turn on the switch, a second behavior 222b to turn off the switch, a third behavior 222c to actuate the switch more generally, a fourth behavior 222d to inspect the switch, and a fifth behavior 222e or schedule function. The operator 12 may select any of these behavior options in the menu in order to have the robot 100 perform that selected behavior 222. In other words, the operator 12 provides a user input indication (e.g., touches) indicating an operator-selection 16 of the graphical representation corresponding to the behavior 222 that the operator 12 would like the robot 100 to perform, thereby causing the robot 100 to execute the corresponding selected behavior 222. In FIG. 3E, the operator 12 has selected, as a first operator-selection 16, 16a, the fifth behavior 222e to schedule a behavior 222. Here, the first selection 16a is shown by greying the graphical representation for the scheduling behavior 222e. Since this is a scheduling function, the operator 12 may select the schedule option and then select another behavior 222 that the operator 12 wants to schedule for the switch box 214. In this example, selecting the schedule icon generates a pop-up menu in the user interface 26 that includes options and/or configurable parameters that allow the operator 12 to schedule a behavior 222.

In FIG. 3E, the operator 12 chooses to schedule the "turn on" behavior 222a as the second selection 14b. A pop-up scheduler may then allow the operator 12 to configure parameters for when the operator 12 wants to schedule the "turn on" behavior 222a. The operator 12 may want the robot 100 to turn the lights on for this section of the warehouse at the start of a particular shift and schedule the behavior 222a to occur at a time before the shift starts so that the lights are on. As another example, when configuring a behavior 222, the operator 12 may add a selected behavior 222 to an already existing routine. For example, the scheduler in FIG. 3E shows that two routines already exist for the robot 100 and enables the operator 12 to select one or both of these routines (e.g., all routines) to add the "turn on" behavior 222a to these existing routines or missions.

Figure 3F:
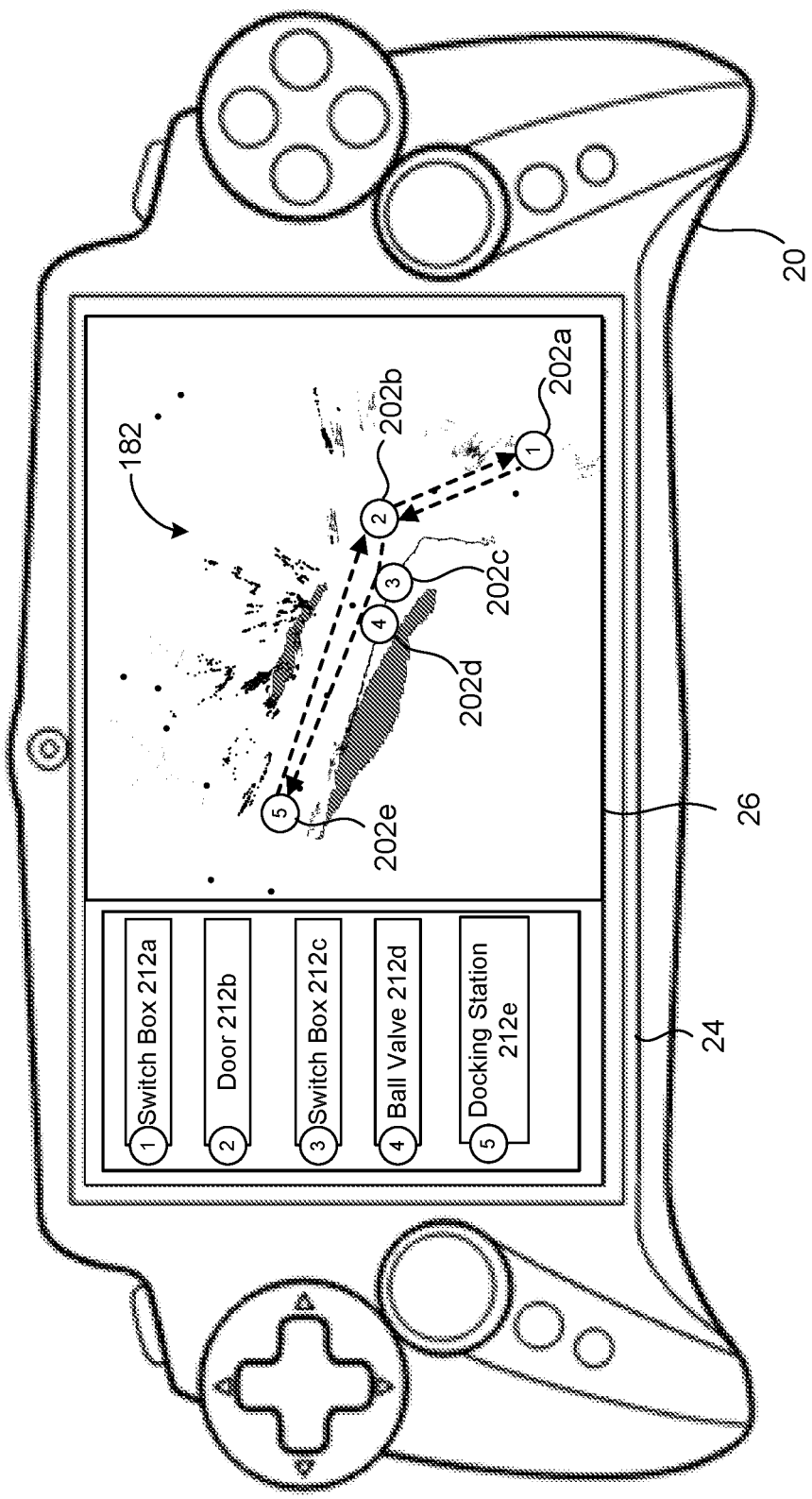
FIG. 3F is a schematic view of an example user interface depicting a map for an environment of the robot of FIG. 1A.

Referring to FIG. 3F, the user interface 26 of the remote controller 20 depicts the localization map 182 that has been modified with interaction points 202, 202a-e that are graphical representations of interactable objects 212 in the mapped environment 10. This figure illustrates that the operator 12 may review objects detected by the object behavior system 200 in a global frame. Here, the global frame is depicted a two-dimensional image, but the localization map 182 may also be a three-dimensional model of the site or environment 10 projected onto the two-dimensional space such that the operator 12 views, for example, a building model like that of a building information model (BIM) or a three dimensional model. In this global frame, like other windows of the user interface 26, the operator 12 may create a mission that instructs the robot 100 to perform some number of behaviors 222 involving interactable objects 212. In this example, the user interface 26 includes a window with a list of identified interactable objects 212 that correspond to the interaction points 202 such that the operator 12 is able to scroll through the site using the map 182 and select interaction points 202 and/or interactable objects 212 to author behaviors 222 for one or more missions. FIG. 3F also illustrates that the operator 12 may configure movement for the robot 100 based on interactable objects 212 or interaction points 202 rather than, or in conjunction with, waypoints that may be present in the map 182. For example, FIG. 3F illustrates a mission where the robot 100 moves from the docking station 202e, 212e through the door 202b, 212b to actuate a first switch box 202a, 212a and then moves back through the door 202b, 212b to turn on the second switch box 202d, 212d in order to have light to open the ball valve 202d, 212d before returning to the docking station 202e, 212e. Here, the movement of the robot 100 during this mission is shown as the segmented line path with arrows that indicate the movement direction of the robot 100. Additionally or alternatively, with a global view from a map 182, the operator 12 may also monitor the robot 100 while it executes a mission because the robot 100 may be configured to provide status feedback for the execution of behaviors 222. For instance, the interaction points 202 may indicate whether the robot 100 has performed the authored behavior(s) 222 at that interaction point 202 or not. In some examples, the interaction point 202 is one color (e.g., red) when the robot 100 has not yet performed the behavior(s) 222 authored for that interaction point 202 and another color (e.g., green) when the robot 100 has successfully performed the behavior(s) 222 authored for that interaction point 202. In a similar sense, the robot 100 may provide some feedback or indicator if the robot 100 fails to perform a behavior 222 or the behavior 222 includes providing feedback to the operator 12. For example, if the robot 100 is to perform a behavior 222 where it inspects that a pressure gauge is in a particular pressure range, the robot 100 may relay or indicate the results of the inspection to the operator 12 via the user interface 26.

Figure 4:
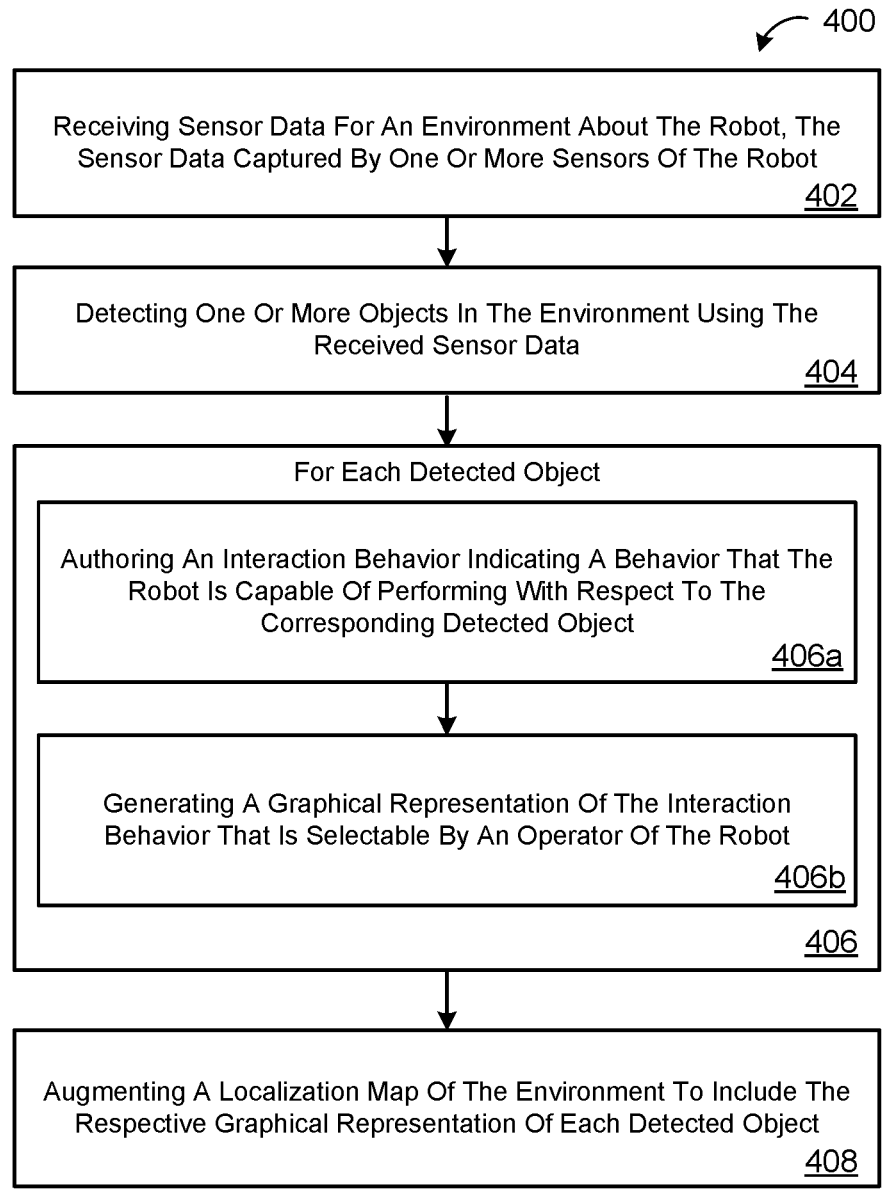
FIG. 4 is a flow chart of an example arrangement of operations for a method of configuring object-based robot control.

FIG. 4 is a flowchart of an example arrangement of operations for a method 400 to configure object-based control for the robot 100. At operation 402, the method 400 receives sensor data 134 for an environment 10 about the robot 100 where the sensor data 134 is captured by one or more sensors 132 of the robot 100. At operation 404, the method 400 detects one or more objects 214 in the environment 10 using the received sensor data 134. At operation 406, for each detected object 214, the method 400 performs two sub-operations 406a-b. At operation 406a, the method 400 authors an interaction behavior 222 indicating a behavior 222 that the robot 100 is capable of performing with respect to the corresponding detected object 214. At operation 406b, the method 400 generates a graphical representation of the interaction behavior 222 that is selectable by an operator 12 of the robot 100. At operation 408, the method 400 augments a localization map 182 of the environment 10 to include the respective graphical representation of each detected object 214.

Figure 5:
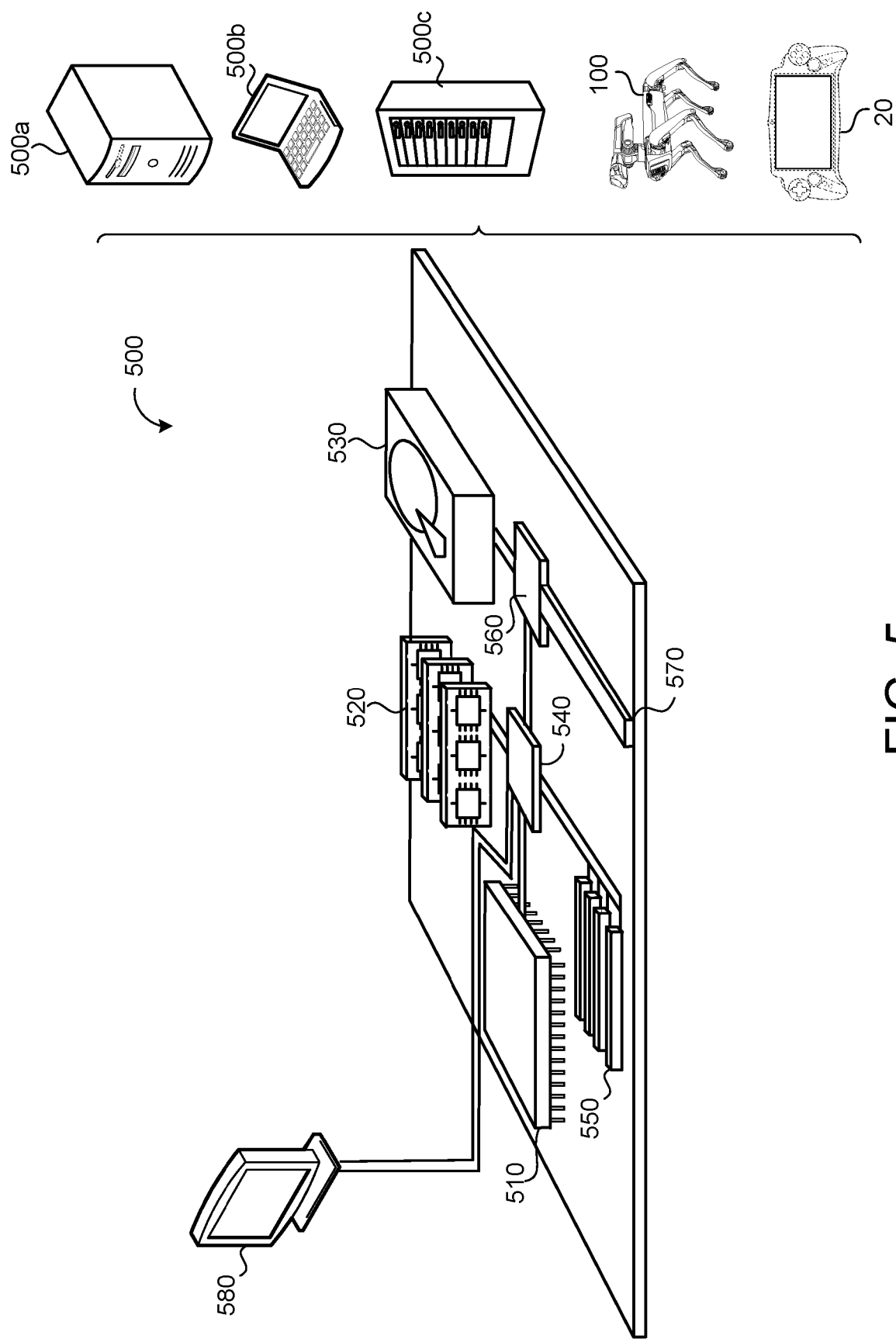
FIG. 5 is a schematic view of an example computing device that may be used to implement the systems and methods described herein.

FIG. 5 is schematic view of an example computing device 500 that may be used to implement the systems (e.g., the sensor system 130, the control system 170, the perception system 180, the computing system 140, the remote system 160, the remote controller 20 and/or user interface 26, and/or the object behavior system 200) and methods (e.g., the method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, as part of a rack server system 500c, as a component of the robot 100, or as a component of the remote controller 20.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
receiving, by data processing hardware of a robot, sensor data from one or more sensors of the robot, the sensor data corresponding to an environment of the robot;
determining, by the data processing hardware, an object in the environment based on the sensor data;
associating, by the data processing hardware, a plurality of actions with the object based on the sensor data;
generating, by the data processing hardware, in a localization map, a localization reference point corresponding to the object and indicating the plurality of actions;
instructing, by the data processing hardware, localization of the robot within the environment using the localization map; and
instructing, by the data processing hardware, performance of an action of the plurality of actions by the robot based on the localization of the robot.

2. The computer-implemented method of claim 1, further comprising:
generating a graphical representation of the plurality of actions.

3. The computer-implemented method of claim 2, further comprising:
causing display of the graphical representation based on a location of the robot corresponding to a location of the object.

4. The computer-implemented method of claim 2, wherein the graphical representation comprises a visual feed from the one or more sensors.

5. The computer-implemented method of claim 1, further comprising:
receiving an input indicating selection of the action, wherein instructing performance of the action is based on the input.

6. The computer-implemented method of claim 2, wherein the graphical representation comprises a menu of selectable actions associated with the plurality of actions.

7. The computer-implemented method of claim 1, further comprising:
configuring a mission based on the action.

8. The computer-implemented method of claim 1, wherein determining the object comprises identifying the object using an object detection model.

9. The computer-implemented method of claim 1, wherein the action comprises a navigational behavior indicating a manner of navigation by the robot in the environment based on the object.

10. The computer-implemented method of claim 9, wherein the navigational behavior further indicates a positioning of the robot with respect to the object.

11. The computer-implemented method of claim 1, wherein the action comprises a pose of the robot for interaction with the object.

12. The computer-implemented method of claim 1, further comprising:
receiving a manually-authored action; and
identifying the plurality of actions based on the manually-authored action.

13. The computer-implemented method of claim 1, wherein associating the plurality of actions with the object comprises:
matching the object to a respective object from a list of objects; and
identifying the plurality of actions based on the list of objects, wherein the list of objects associates the respective object with the plurality of actions.

14. The computer-implemented method of claim 1, further comprising:
generating the localization map using the sensor data, the localization map comprising one or more localization reference points based on one or more features associated with the environment.

15. A robot comprising:
a body;
a sensor system at least partially disposed on the body and comprising one or more sensors;
data processing hardware in communication with the sensor system; and
memory hardware in communication with the data processing hardware, the memory hardware storing instructions, wherein execution of the instructions by the data processing hardware causes the data processing hardware to:
receive sensor data from the one or more sensors, the sensor data corresponding to an environment of the robot;
determine an object in the environment based on the sensor data;
associate a plurality of actions with the object based on the sensor data;
generate, in a localization map, a localization reference point corresponding to the object and indicating the plurality of actions;
instruct localization of the robot within the environment using the localization map; and
instruct performance of an action of the plurality of actions by the robot based on the localization of the robot.

16. The robot of claim 15, wherein the execution of the instructions by the data processing hardware further causes the data processing hardware to:
generate a graphical representation of the plurality of actions.

17. The robot of claim 16, wherein the execution of the instructions by the data processing hardware further causes the data processing hardware to:
cause display of the graphical representation based on a location of the robot corresponding to a location of the object.

18. The robot of claim 16, wherein the graphical representation comprises a visual feed from the one or more sensors.

19. The robot of claim 15, wherein the execution of the instructions by the data processing hardware further causes the data processing hardware to:
receive an input indicating selection of the action, wherein instructing performance of the action is based on the input.

20. The robot of claim 16, wherein the graphical representation comprises a menu of selectable actions associated with the plurality of actions.

21. The robot of claim 15, wherein the execution of the instructions by the data processing hardware further causes the data processing hardware to:
configure a mission based on the action.

22. The robot of claim 15, wherein to determine the object, the execution of the instructions by the data processing hardware further causes the data processing hardware to identify the object.

23. The robot of claim 15, wherein the action comprises a navigational behavior indicating a manner of navigation by the robot in the environment based on the object.

24. The robot of claim 23, wherein the navigational behavior further indicates a positioning of the robot with respect to the object.

25. The robot of claim 15, wherein the action comprises a pose of the robot for interaction with the object.

26. The robot of claim 15, wherein the execution of the instructions by the data processing hardware further causes the data processing hardware to:
receive a manually-authored action; and
identify the plurality of actions based on the manually-authored action.

27. The robot of claim 15, wherein to associate the plurality of actions with the object, the execution of the instructions by the data processing hardware further causes the data processing hardware to:
match the object to a respective object from a list of objects; and
identify the plurality of actions based on the list of objects, wherein the list of objects associates the respective object with the plurality of actions.

28. The robot of claim 15, wherein the execution of the instructions by the data processing hardware further causes the data processing hardware to:
generate the localization map using the sensor data, the localization map comprising one or more localization reference points based on one or more features associated with the environment.

* * * * *